US009145505B2

(12) United States Patent
Kikuchi et al.

(10) Patent No.: US 9,145,505 B2
(45) Date of Patent: Sep. 29, 2015

(54) POLYAMIDE-IMIDE RESIN BASED INSULATING VARNISH AND INSULATED WIRE COVERED WITH SAME

(75) Inventors: Hideyuki Kikuchi, Hitachi (JP); Daisuke Hino, Hitachi (JP); Yuji Takano, Mito (JP); Yasuhiro Funayama, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 262 days.

(21) Appl. No.: 12/870,400

(22) Filed: Aug. 27, 2010

(65) Prior Publication Data

US 2011/0048766 A1    Mar. 3, 2011

(30) Foreign Application Priority Data

Aug. 31, 2009   (JP) .................................. 2009-200086

(51) Int. Cl.
| | |
|---|---|
| *H01B 7/02* | (2006.01) |
| *C09D 179/08* | (2006.01) |
| *C08G 73/10* | (2006.01) |
| *C08G 73/14* | (2006.01) |
| *H01B 3/30* | (2006.01) |

(52) U.S. Cl.
CPC .......... *C09D 179/08* (2013.01); *C08G 73/1035* (2013.01); *C08G 73/14* (2013.01); *H01B 3/306* (2013.01); *C08L 2203/20* (2013.01)

(58) Field of Classification Search
USPC ....................................... 174/110 R, 110 SR
See application file for complete search history.

(56) References Cited

U.S. PATENT DOCUMENTS

| 5,004,795 | A | * | 4/1991 | Zecher et al. .................... 528/73 |
| 5,607,719 | A | * | 3/1997 | Winkler et al. ............... 427/117 |
| 2003/0176617 | A1 | | 9/2003 | Shen |
| 2006/0240255 | A1 | * | 10/2006 | Kikuchi et al. ............... 428/375 |
| 2009/0176961 | A1 | | 7/2009 | Kikuchi et al. |

FOREIGN PATENT DOCUMENTS

| CN | 101397477 A | 4/2009 |
|---|---|---|
| JP | 05-225830 | 9/1993 |
| JP | 06-145281 | 5/1994 |
| JP | 07-134912 | 5/1995 |
| JP | 09-045143 | 2/1997 |
| JP | 10-007984 | 1/1998 |
| JP | 2001-172360 | 6/2001 |
| JP | 2004-512401 | 4/2004 |
| JP | 2007-0270074 | 10/2007 |
| JP | 2008-285660 | 11/2008 |

(Continued)

OTHER PUBLICATIONS

JP Office Action of Appln. No. 2010-187762 dated Jun. 5, 2012 with partial English translation.

(Continued)

*Primary Examiner* — Chau N Nguyen
(74) *Attorney, Agent, or Firm* — Crowell & Moring LLP

(57) ABSTRACT

There is provided an insulated wire including: a conductor wire; and a polyamide-imide insulation coating formed around the conductor wire, the polyamide-imide insulation coating being made from a polyamide-imide resin based insulating varnish, the varnish being synthesized by reaction of an isocyanate constituent and an acid constituent in a solvent, the isocyanate constituent including 5 to 50 mol % of 2,4'-diphenylmethane-diisocyanate having a flexible molecular structure.

13 Claims, 1 Drawing Sheet

(56) References Cited

FOREIGN PATENT DOCUMENTS

| | | | |
|---|---|---|---|
| JP | 2009-161683 | | 7/2009 |
| WO | WO 2009/061020 | * | 5/2009 |

OTHER PUBLICATIONS

CN Office Action of Appln. No. 201010253700.3 dated Jan. 13, 2014 with partial English translation.

* cited by examiner

POLYAMIDE-IMIDE RESIN BASED INSULATING VARNISH AND INSULATED WIRE COVERED WITH SAME

CLAIM OF PRIORITY

The present application claims priority from Japanese patent application serial no. 2009-200086 filed on Aug. 31, 2009, the content of which is hereby incorporated by reference into this application.

BACKGROUND OF THE INVENTION

1. Field of the Invention

The present invention relates to a polyamide-imide resin based insulating varnish from which a highly flexible insulation coating can be made, and an insulated wire having good press-formability.

2. Description of the Related Art

Enameled wires are mainly used for coils in electrical equipment such as motors and transformers, and are typically formed by applying an insulating varnish around a conductor wire and baking the varnish. Such enameled wires may undergo severe mechanical stresses during coil winding processes.

An approach for relieving such mechanical stresses is to provide the surface of an enameled wire with more lubricity. And, a method for providing an enameled wire with a lubricative surface is to apply a highly lubricating material on the outermost surface of the wire and bake the applied material. Known examples of such highly lubricating materials include: a lubricant including paraffin and a fatty acid ester as major constituents, and an insulating varnish containing such a lubricant; an insulating varnish containing a mixture of a stabilized isocyanate and a lubricant; and an insulating varnish containing a titanate ester (see, e.g., JP-A Hei 9(1997)-45143 and JP-A Hei 7(1995)-134912).

With the recent strong trend towards environmentalism, a demand exists for smaller and more efficient motors and transformers. For example, there are increasing cases in which a high-power motor is mounted in a very small space, particularly in hybrid vehicles. Coils in such small and high-power motors occupy a larger volume in the motor. To fabricate such coils, an enameled wire needs to be wound more compactly (higher compression ratio) than before. In such severe winding processes, enameled wires are often press-formed or compressed to too large an extent to be withstood.

To withstand such severe press-forming processes, insulation coatings with an improved wear resistance over conventional coatings are often used. In many cases, such highly wear resistant insulation coatings are formed from a polyamide-imide resin based insulating varnish. For example, 3,3'-dimethylbiphenyl-4,4'-diisocyanate (TODI) is used as an isocyanate constituent of a polyamide-imide resin based insulating varnish to rigidify the backbone of the polyamide-imide resin in the varnish. This improves the wear resistance of the resulting insulation coating and prevents occurrence of damages (such as cracks) in the coating during press-forming processes. Thus, the press-formability of the resulting insulated wire is enhanced. For example, see JP-B 2936895 and JP-A 2007-270074.

However, the polyamide-imide resin contained in the above-described conventional polyamide-imide resin based insulating varnish has a rigid backbone, and therefore insulation coatings made from such an insulating varnish have the disadvantage of poor flexibility (poor elongation properties).

As described above, during recent demanding press-forming processes, insulation coatings often receive very severe mechanical stresses, and are, as a result, deformed by compression to a very large extent. Therefore, such poorly flexible conventional polyamide-imide resin based insulation coatings as described above are particularly problematic when subjected to such large mechanical stresses because they can be deformed (compressed) only up to a certain limit, and may, above the limit, suffer from damages such as cracks.

SUMMARY OF THE INVENTION

In view of the foregoing, it is an objective of the present invention to provide a polyamide-imide resin based insulating varnish from which a highly flexible insulation coating with good press-formability can be made, and an insulated wire covered with such an insulation coating.

(1) According to one aspect of the present invention, there is provided a polyamide-imide resin based insulating varnish synthesized by reaction of an isocyanate constituent and an acid constituent in a solvent, in which the isocyanate constituent includes 5 to 50 mol % of 2,4'-diphenylmethane-diisocyanate having a flexible molecular structure.

In the above aspect (1) of the invention, the following modifications and changes can be made.

(i) The isocyanate constituent further includes at least one isocyanate selected from the group consisting of 4,4'-diphenylmethane-diisocyanate, tolylene diisocyanate, diphenyl ether diisocyanate and naphthalene diisocyanate.

(2) According to another aspect of the present invention, there is provided an insulated wire including:

a conductor wire; and a polyamide-imide insulation coating formed around the conductor wire, the polyamide-imide insulation coating being made from a polyamide-imide resin based insulating varnish, the varnish being synthesized by reaction of an isocyanate constituent and an acid constituent in a solvent, the isocyanate constituent including 5 to 50 mol % of 2,4'-diphenylmethane-diisocyanate having a flexible molecular structure.

In the above aspect (2) of the invention, the following modifications and changes can be made.

(ii) Even when the wire is compressed to such an extent that its diameter is decreased by 50% or less, the compressed wire still maintains a breakdown voltage equal to or higher than 60% of that of the wire before the compression.

Advantages of the Invention

According to the present invention, it is possible to provide a polyamide-imide resin based insulating varnish from which a highly flexible insulation coating with good press-formability can be made, and an insulated wire covered with such an insulation coating.

DETAILED DESCRIPTION OF THE PREFERRED EMBODIMENTS

Hereafter, a preferred embodiment of the present invention will be described in detail with reference to the accompanying drawings. However, the invention is not limited to the specific embodiments described below, but various combinations and modifications are possible without departing from the spirit and scope of the invention.

First, structures of insulated wires of the present invention are explained with reference to FIGS. 1 to 3. Basically, the invented insulated wires are formed by applying a polyamide-imide resin based insulating varnish of the invention around a conductor wire and baking the applied varnish.

Figure 1:
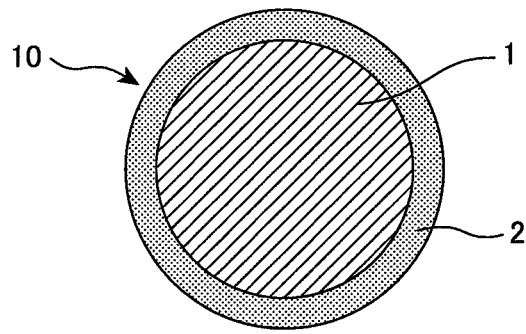
FIG. 1 is a schematic illustration showing a cross-sectional view of an insulated wire according to an embodiment of the present invention.

FIG. 1 is a schematic illustration showing a cross-sectional view of an insulated wire according to an embodiment of the present invention. The insulated wire 10 is formed by applying a polyamide-imide resin based insulating varnish of the invention around a conductor wire 1 and baking the applied varnish to form a polyamide-imide insulation coating 2. The insulated wire 10 of the invention has excellent flexibility and excellent press-formability.

Figure 2:
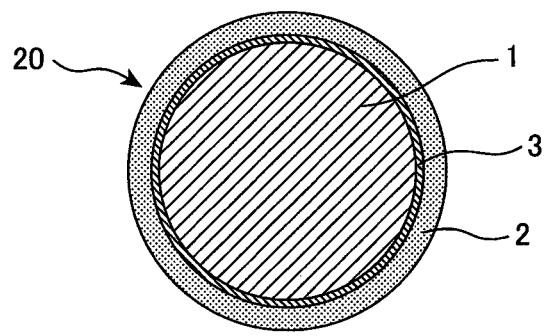
FIG. 2 is a schematic illustration showing a cross-sectional view of an insulated wire according to a variation of an embodiment of the present invention.

FIG. 2 is a schematic illustration showing a cross-sectional view of an insulated wire according to a variation of an embodiment of the present invention. The insulated wire 20 is formed as follows: First, a first insulation coating 3 not according to the invention is coated around a conductor wire 1. Then, a polyamide-imide resin based insulating varnish of the invention is applied around the first insulation coating 3 and baked to form a polyamide-imide insulation coating 2. The insulated wire 20 of the invention also has excellent flexibility and excellent press-formability.

Figure 3:
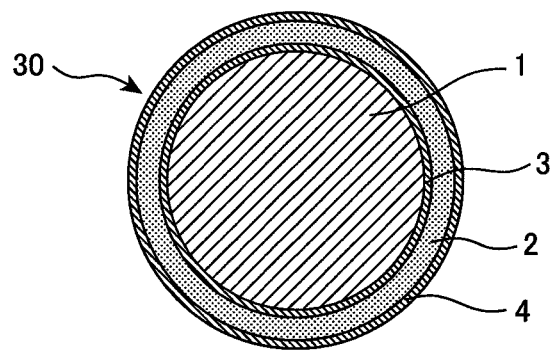
FIG. 3 is a schematic illustration showing a cross-sectional view of an insulated wire according to another variation of an embodiment of the present invention.

FIG. 3 is a schematic illustration showing a cross-sectional view of an insulated wire according to another variation of an embodiment of the present invention. The insulated wire 30 is formed by further forming a second insulation coating 4 around the polyamide-imide insulation coating 2 of the insulated wire 20 described in FIG. 2. The insulated wire 30 of the invention also has excellent flexibility and excellent press-formability.

There is no particular limitation on the materials for the insulation coatings 3 and 4, but any insulating varnish used for conventional enameled wires may be used. Examples of conventionally used insulating varnishes include: polyimide resin based insulating varnishes; polyesterimide resin based insulating varnishes; polyamide-imide resin based insulating varnishes; and Class H polyester resin based insulating varnishes. The insulation coating 3 around the conductor wire 1 and the outermost insulation coating 4 may be made from the same or different material.

In the FIG. 3 structure, the first insulation coating 3 may not be formed. That is, a polyamide-imide insulation coating 2 of the invention may first be formed around the conductor wire 1 and then another insulation coating 4 not according to the invention may be formed around the polyamide-imide insulation coating 2. In this structure and the FIG. 3 structure, the outermost insulation coating 4 may be a self-lubricating coating. Also, in the structures of FIGS. 2 and 3, the inner insulation coating 3 may be an adhesive coating for enhancing adhesion between the conductor wire 1 and the polyamide-imide insulation coating 2 of the invention.

Next, polyamide-imide resin based insulating varnishes according to the present invention will be described in detail.

Polyamide-imide resin based insulating varnishes according to the present invention contain 2,4'-diphenylmethane-diisocyanate (2,4'-MDI) as one of the starting aromatic diisocyanate constituents, the 2,4'-MDI having a flexible structure. This can enhance the flexibility (elongation properties) of the resulting polyamide-imide insulation coating while maintaining other important properties (such as thermal resistance) comparable to those of conventional polyamide-imide insulation coatings.

Specifically, even when a wire insulated with a coating made from a polyamide-imide resin based insulating varnish of the invention is press-deformed, the resulting deformed wire can maintain a relatively high breakdown voltage. More specifically, even when an invented insulated wire is compressed to such an extent that its diameter is decreased to 50%, the thus compressed wire still maintains a breakdown voltage higher than 60% of that of the pre-compressed wire.

The isocyanate constituent of polyamide-imide resin based insulating varnishes according to the present invention contains 5 to 50 mol % of 2,4'-MDI having a flexible structure, and preferably also contains 4,4'-diphenylmethane-diisocyanate (4,4'-MDI) having a rigid straight chain structure. The 2,4'-MDI is most preferable as an isocyanate constituent having a flexible structure because it can improve the flexibility of the resulting insulation coating while maintaining other important properties to levels comparable to those of conventional polyamide-imide resin based insulating varnishes. Instead of or combined with 4,4'-MDI, an isomer (isomers) of 4,4'-MDI (such as 3,4'-MDI, 3,3'-MDI, 2,3'-MDI and 2,2'-MDI) may be used.

The 2,4'-MDI content in the isocyanate constituent is preferably from 5 to 50 mol %, and more preferably from 10 to 40 mol %. Contents less than 5 mol % will not provide sufficient effect of improving the elongation properties of the resulting polyamide-imide insulation coating. On the other hand, contents larger than 50 mol % will decrease the synthesis efficiency of the insulating varnish, thus degrading the characteristics of the resulting insulation coating.

Examples of other preferable isocyanate constituents combinable with 2,4'-MDI include: aromatic diisocyanates (such as tolylene diisocyanate (TDI), diphenyl ether diisocyanate (EDI), naphthalene diisocyanate (NDI), phenylene diisocyanate (PDI), xylylene diisocyanate (XDI), diphenylsulfone diisocyanate (SDI), bitolylene diisocyanate (TODI) and dianisidine diisocyanate (DADI)); biphenyl compounds; and isomers of these compounds. In addition, the following isocyanate constituents may also be combined with 2,4'-MDI as needed: aliphatic diisocyanates (such as hexamethylene diisocyanate (HDI), isophorone diisocyanate (IPDI), dicyclohexyl methane diisocyanate (H-MDI) and hydrogenated XDI); polyfunctional diisocyanates (such as triphenylmethane triisocyanate); polymeric isocyanates; and multimers (such as multimeric TDIs).

Sole use of trimellitic anhydride (TMA) is most preferable as an acid constituent of polyamide-imide resin based insulating varnishes of the present invention. However, the following acid constituents may also be combined with TMA as needed: aromatic tetracarboxylic acid dianhydrides (such as pyromellitic dianhydride (PMDA), benzophenonetetracarboxylic acid dianhydride (BTDA), biphenyltetracarboxylic acid dianhydride (S-BPDA), diphenylsulfonetetracarboxylic acid dianhydride (DSDA), and oxydiphthalic acid dianhydride (ODPA)) and isomers of these aromatic tetracarboxylic acid dianhydrides; alicyclic tetracarboxylic acid dianhydrides (such as butane tetracarboxylic acid dianhydride and 5-(2,5-dioxotetrahydro-3-furanyl)-3-methyl-3-cyclohexane-1,2-dicarboxylic acid anhydride) and isomers of these alicyclic tetracarboxylic dianhydrides; and tricarboxylic acids (such as trimesic acid and tris-(2-carboxyethyl)isocyanurate (CIC acid)) and isomers of these tricarboxylic acids. However, the addition of any one of the above-listed materials is preferable only when it does not sacrifice the thermal resistance or elongation properties of the resulting polyamide-imide insulation coating.

A reaction-enhancing catalyst (such as amines, imidazoles, and imidazolines) may be used to accelerate synthesis of a polyamide-imide resin based insulating varnish as long as it does not destabilize the varnish.

EXAMPLES

Testing Method

First, the method used to test the press-formability and breakdown voltage of insulated wires will be reviewed.

There is no limitation on a method for evaluating the press-formability of insulated wires, but any method may be used as long as it can measure the deformation of an insulated wire after the wire is compressed. For example, insulated wires are preferably compressed by using a pressing jig having two pressing plates which are hard-chromium plated and mirror polished. More preferably, in order to facilitate adjustment of the pressing depth of the above pressing jig, the pressing jig is equipped with a height gauge. Or, the pressing jig is so configured that it cannot press an insulated wire to more than a preset depth (e.g., there may be used various adjustment plates having different thicknesses, each being inserted between the pressing plates in use to limit the pressing depth). Using such a pressing jig described above, an insulated wire is compressed to various extents (i.e., its diameter is decreased to various predetermined values). Then, the uncompressed and compressed wires are measured for the breakdown voltage to evaluate the press-formability of the insulated wire.

The breakdown voltage of an (uncompressed or compressed) insulated wire is measured, e.g., as follows: Two test wires cut from the same insulated wire are twisted around each other and the breakdown voltage between the conductors of the two test wires is measured. Or, an electrode is formed on an insulated wire and the breakdown voltage between the conductor wire and the electrode is measured. However, the method for measuring the breakdown voltage of an insulated wire is not particularly limited to the above ones. Also, there is no particular limitation on the electrode formed on an insulated wire as long as it properly functions. Most preferably, an insulated wire is dipped in a liquid electrode (such as mercury, a low melting point metal, a salt solution, and a mixture of glycerin and a salt solution) because this method provides high measurement accuracy.

(Preparation Method for Insulating Varnish)

Various polyamide-imide resin based insulating varnishes were synthesized in the following manner: First, the starting materials for each of Examples 1 to 10 (shown in Table 1 described later) and Comparative examples 1 to 8 (shown in Table 2 described later) were introduced into a flask equipped with a stirrer, reflux condenser, nitrogen inlet tube, and thermometer. Next, the mixture in the flask was heated to 130° C. by about 1 hour while being stirred, and was then reacted in the flask at this temperature for 2 hours until a polyamide-imide resin solution with a reduced viscosity of approximately 0.5 dl/g was obtained. Finally, 100 parts by weight of the resulting polyamide-imide resin solution was diluted with 300 parts by weight of a solvent.

Preparation of Example 1

First, 12.5 g (0.05 mol) of 2,4'-diphenylmethane-diisocyanate (MDI) plus 237.5 g (0.95 mol) of 4,4'-MDI (as an isocyanate constituent) and 192.0 g (1.0 mol) of TMA (as an acid constituent) were reacted in an N-methylpyrrolidone (NMP) solvent (1000 g) for synthesis. Then, the solution was further diluted with 300 g of N,N-dimethylformamide (DMF). Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire, see FIG. 1) was formed.

Preparation of Example 2

First, 50.0 g (0.20 mol) of 2,4'-MDI plus 200.0 g (0.80 mol) of 4,4'-MDI (as an isocyanate constituent) and 192.0 g (1.0 mol) of TMA (as an acid constituent) were reacted in an NMP solvent (1000 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Example 3

First, 125.0 g (0.50 mol) of 2,4'-MDI plus 125.0 g (0.50 mol) of 4,4'-MDI (as an isocyanate constituent) and 192.0 g (1.0 mol) of TMA (as an acid constituent) were reacted in an NMP solvent (1000 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 30 μm thick enamel coating (enameled wire) was formed.

Preparation of Example 4

First, 50.0 g (0.20 mol) of 2,4'-MDI plus 139.2 g (0.80 mol) of TDI (as an isocyanate constituent) and 172.8 g (0.9 mol) of TMA plus 21.8 g (0.1 mol) of PMDA (as an acid constituent) were reacted in an NMP solvent (900 g) for synthesis. Then, the solution was further diluted with 250 g of DMF. Thus, a polyamide-imide resin-based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Example 5

First, 50.0 g (0.20 mol) of 2,4'-MDI plus 150.0 g (0.60 mol) of 4,4'-MDI plus 25.2 g (0.10 mol) of EDI plus 21.0 g (0.1 mol) of NDI (as an isocyanate constituent) and 172.8 g (0.9 mol) of TMA plus 32.2 g (0.1 mol) of BTDA (as an acid constituent) were reacted in an NMP solvent (1050 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 30 μm thick enamel coating (enameled wire) was formed.

Preparation of Example 6

First, 50.0 g (0.20 mol) of 2,4'-MDI plus 200.0 g (0.80 mol) of 4,4'-MDI (as an isocyanate constituent) and 172.8 g (0.9 mol) of TMA plus 32.2 g (0.1 mol) of BTDA (as an acid constituent) were reacted in an NMP solvent (1050 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Example 7

First, 50.0 g (0.20 mol) of 2,4'-MDI plus 200.0 g (0.80 mol) of 4,4'-MDI (as an isocyanate constituent) and 153.6 g (0.8 mol) of TMA plus 62.0 g (0.2 mol) of ODPA (as an acid constituent) were reacted in an NMP solvent (1050 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Example 8

First, 50.0 g (0.20 mol) of 2,4'-MDI plus 200.0 g (0.80 mol) of 4,4'-MDI (as an isocyanate constituent) and 192.0 g (1.0 mol) of TMA (as an acid constituent) were reacted in an NMP solvent (1000 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared.

After that, three different polyamide-imide resin based insulating varnishes were sequentially applied around a 0.8 mm diameter copper wire. Specifically, the copper wire was sequentially coated with a highly adhesive polyamide-imide coating (inner layer), an insulation coating made from the polyamide-imide resin based insulating varnish according to Example 8 (intermediate layer) and a self-lubricating polyamide-imide coating (outer layer). Thus, a copper wire covered with a three-layer enamel coating having a total thickness of 31 μm (enameled wire, see FIG. 3) was formed.

Preparation of Example 9

First, 50.0 g (0.20 mol) of 2,4'-MDI plus 200.0 g (0.80 mol) of 4,4'-MDI (as an isocyanate constituent) and 192.0 g (1.0 mol) of TMA (as an acid constituent) were reacted in an NMP solvent (1000 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared.

After that, two different polyamide-imide resin based insulating varnishes were sequentially applied around a 0.8 mm diameter copper wire. Specifically, the copper wire was sequentially coated with a highly adhesive polyamide-imide coating (inner layer) and an insulation coating made from the polyamide-imide resin based insulating varnish according to Example 9 (outer layer). Thus, a copper wire covered with a two-layer enamel coating having a total thickness of 30 μm (enameled wire, see FIG. 2) was formed.

Preparation of Example 10

First, 50.0 g (0.20 mol) of 2,4'-MDI plus 200.0 g (0.80 mol) of 4,4'-MDI (as an isocyanate constituent) and 192.0 g (1.0 mol) of TMA (as an acid constituent) were reacted in an NMP solvent (1000 g) for synthesis. Then, the solution was further diluted with 300 g of DMF. Thus, a polyamide-imide resin based insulating varnish (used for highly flexible insulation coatings) having a resin constituent concentration of approximately 25 mass % was prepared.

After that, two different polyamide-imide resin based insulating varnishes were sequentially applied around a 0.8 mm diameter copper wire. Specifically, the copper wire was sequentially coated with an insulation coating made from the polyamide-imide resin based insulating varnish according to Example 10 (inner layer) and a conventional polyamide-imide insulation coating (outer layer). Thus, a copper wire covered with a two-layer enamel coating having a total thickness of 30 μm (enameled wire) was formed.

Preparation of Comparative Example 1

First, 250.0 g (1.00 mol) of 4,4'-MDI (as an isocyanate constituent) and 192.0 g (1.0 mol) of TMA (as an acid constituent) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Comparative Example 2

First, 5.0 g (0.02 mol) of 2,4'-MDI plus 245.0 g (0.98 mol) of 4,4'-MDI (as an isocyanate constituent) and 192.0 g (1.0 mol) of TMA (as an acid constituent) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Comparative Example 3

First, 175.0 g (0.70 mol) of 2,4'-MDI plus 75.0 g (0.30 mol) of 4,4'-MDI (as an isocyanate constituent), 192.0 g (1.0 mol) of TMA (as an acid constituent) and 2.2 g of dimethylimidazole (as a reaction enhancing catalyst) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared. After that, the thus prepared polyamide-imide resin based insulating varnish was applied around a 0.8 mm diameter copper wire and baked. Thus, a copper wire covered with a 30 μm thick enamel coating (enameled wire) was formed.

Preparation of Comparative Example 4

First, 50.0 g (0.20 mol) of 4,4'-MDI plus 139.2 g (0.80 mol) of TDI (as an isocyanate constituent) and 172.8 g (0.9 mol) of TMA plus 21.8 g (0.1 mol) of PMDA (as an acid constituent) were reacted in an NMP solvent (900 g) for synthesis. Then, the solution was further diluted with 250 g of DMF. Thus, a polyamide-imide resin based insulating varnish having a resin constituent concentration of approximately 25 mass % was prepared. After that, the thus prepared polyamide-imide resin based insulating varnish was applied around a 0.8 mm diameter copper wire and baked. Thus, a copper wire covered with a 30 μm thick enamel coating (enameled wire) was formed.

Preparation of Comparative Example 5

First, 250.0 g (1.0 mol) of 4,4'-MDI (as an isocyanate constituent) and 172.8 g (0.9 mol) of TMA plus 32.2 g (0.1 mol) of BTDA (as an acid constituent) were reacted in an NMP solvent (1050 g) for synthesis, and then the solution was further diluted with 300 g of DMF. Thus, a polyamide-imide resin based insulating varnish having a resin constituent concentration of approximately 25 mass % was prepared. After that, the thus prepared polyamide-imide resin based insulating varnish was applied around a 0.8 mm diameter copper wire and baked. Thus, a copper wire covered with a 31 μm thick enamel coating (enameled wire) was formed.

Preparation of Comparative Example 6

First, 250.0 g (1.0 mol) of 4,4'-MDI (as an isocyanate constituent) and 192.0 g (1.0 mol) of TMA (as an acid constituent) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared.

After that, three different polyamide-imide resin based insulating varnishes were sequentially applied around a 0.8 mm diameter copper wire. Specifically, the copper wire was sequentially coated with a highly adhesive polyamide-imide coating (inner layer), an insulation coating made from the polyamide-imide resin based insulating varnish according to Comparative example 6 (intermediate layer) and a self-lubricating polyamide-imide coating (outer layer). Thus, a copper wire covered with a three-layer enamel coating having a total thickness of 31 μm (enameled wire) was formed.

Preparation of Comparative Example 7

First, 250.0 g (1.0 mol) of 4,4'-MDI (as an isocyanate constituent) and 192.0 g (1.0 mol) of TMA (as an acid constituent) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared.

After that, two different polyamide-imide resin based insulating varnishes were sequentially applied around a 0.8 mm diameter copper wire. Specifically, the copper wire was sequentially coated with a highly adhesive polyamide-imide coating (inner layer) and an insulation coating made from the polyamide-imide resin based insulating varnish according to Comparative example 7 (outer layer). Thus, a copper wire covered with a two-layer enamel coating having a total thickness of 30 μm (enameled wire) was formed.

Preparation of Comparative Example 8

First, 250.0 g (1.0 mol) of 4,4'-MDI (as an isocyanate constituent) and 192.0 g (1.0 mol) of TMA (as an acid constituent) were reacted in an NMP solvent (1000 g) for synthesis, and then the solution was further diluted with 300 g of DMF. Thus, a polyamide-imide resin based insulating varnish having a resin constituent concentration of approximately 25 mass % was prepared.

After that, two different polyamide-imide resin based insulating varnishes were sequentially applied around a 0.8 mm diameter copper wire. Specifically, the copper wire was sequentially coated with an insulation coating made from the polyamide-imide resin based insulating varnish according to Comparative example 8 (inner layer) and a conventional polyamide-imide insulating varnish (outer layer). Thus, a copper wire covered with a two-layer enamel coating having a total thickness of 30 μm (enameled wire) was formed.

The features of Examples 1 to 10 and Comparative examples 1 to 8 can be broadly summarized as follows.

Each of Examples 1 to 7 is an insulated wire 10 described in FIG. 1. That is, in Examples 1 to 7, a polyamide-imide resin based insulating varnish of the present invention (prepared from the starting materials shown in Table 1) was applied around a conductor wire 1 and baked. Thus, an insulated wire 10 (a conductor wire 1 insulated with a polyamide-imide insulation coating 2) was formed.

Example 8 is an insulated wire 30 described in FIG. 3. That is, in Example 8, a highly adhesive polyamide-imide resin based insulating coating 3 (inner layer) was first formed around a conductor wire 1. Then, a polyamide-imide resin based insulating varnish of the invention (prepared from the starting materials according to Example 8 shown in Table 1) was applied around the highly adhesive insulating coating 3 and baked to form a polyamide-imide insulation coating 2 (intermediate layer). Finally, a self-lubricating polyamide-imide resin based insulating varnish was applied around the polyamide-imide insulation coating 2 and baked to form an insulation coating 4 (outer layer). Thus, an insulated wire 30 (a conductor wire 1 insulated with a three-layer insulation coating) was formed.

Example 9 is an insulated wire 20 described in FIG. 2. That is, in Example 9, a highly adhesive polyamide-imide resin based insulation coating 3 (inner layer) was first formed around a conductor wire 1. Then, a polyamide-imide resin based insulating varnish of the invention (prepared from the starting materials according to Example 9 shown in Table 1) was applied around the highly adhesive insulation coating 3 and baked to form a polyamide-imide insulation coating 2 (outer layer). Thus, an insulated wire 20 (a conductor wire 1 insulated with a two-layer insulation coating) was formed.

In Example 10, a polyamide-imide resin based insulating varnish of the invention (prepared from the starting materials according to Example 10 shown in Table 1) was first applied around a conductor wire 1 and baked to form an inner polyamide-imide insulation coating. Then, a conventional polyamide-imide resin based insulating varnish was applied around the inner polyamide-imide insulation coating and baked to form an outer polyamide-imide insulation coating. Thus, a conductor wire insulated with a two-layer insulation coating was formed.

On the other hand, in each of Comparative examples 1 to 5, a polyamide-imide resin based insulating varnish (prepared not according to the present invention but from the starting materials shown in Table 2) was applied around a conductor wire and baked.

In Comparative example 6, a highly adhesive polyamide-imide resin based insulating varnish was first applied around a conductor wire and baked to form an inner insulation coating. Then, a polyamide-imide resin based insulating varnish (prepared not according to the invention but from the starting materials according to Comparative example 6 shown in Table 2) was applied around the inner insulation coating and baked to form an intermediate polyamide-imide insulation coating. Finally, a self-lubricating polyamide-imide resin based insulating varnish was applied around the intermediate coating and baked to form an outer insulation coating.

In Comparative example 7, a highly adhesive polyamide-imide resin based insulating varnish was first applied around a conductor wire and baked to form an inner insulation coating. Then, a polyamide-imide resin based insulating varnish (prepared not according to the invention but from the starting materials according to Comparative example 7 shown in Table 2) was applied around the inner insulation coating and baked to form an outer polyamide-imide insulation coating.

In Comparative example 8, a polyamide-imide resin based insulating varnish (prepared not according to the invention but from the starting materials according to Comparative example 8 shown in Table 2) was first applied around a conductor wire and baked to form an inner insulation coating. Then, a conventional polyamide-imide resin based insulating varnish was applied around the inner insulation coating and baked to form an outer insulation coating.

For each of Examples 1 to 10 and Comparative examples 1 to 8, appearance (transparency and color) of the polyamide-imide resin based insulating varnish was observed, and the elongation percentage of the resulting polyamide-imide coating was measured. Herein, these measurements were performed for the single (or inner) coating in Examples 1 to 7 and 10 and Comparative examples 1 to 5 and 8; for the intermediate coating in Example 8 and Comparative example 6; and for the outer coating in Example 9 and Comparative example 7. Also, the properties of each of the resulting insulated wires were measured according to JIS C 3003 entitled "Methods of test for enameled wires". The results are summarized in Tables 1 and 2.

The press-formability of the insulated wires was evaluated as follows: A pressing jig having two pressing plates which were hard-chromium plated and mirror polished was prepared. Each insulated wire was compressed by placing the wire between the pressing plates of the jig, and then pressing the pressing plates against each other using a pressing machine. Herein, each insulated wire was compressed to various extents. That is, the diameter of each wire was decreased by 0.334 mm (40%), by 0.430 mm (50%), and by 0.516 mm (60%). Then, the uncompressed wire and the various compressed wires were measured for the breakdown voltage.

The breakdown voltage measurement was performed as follows: Each (uncompressed or compressed) insulated wire was dipped in a mixed liquid of glycerin and a saturated salt solution. Then, commercial-frequency voltages were applied across the mixed liquid and the wire conductor at an increment of 500 V/sec. The breakdown voltage of the wire was defined as the voltage at which the current between the wire conductor and the mixed liquid reached 10 mA.

TABLE 1

|  |  |  | Example 1 | Example 2 | Example 3 | Example 4 | Example 5 |
|---|---|---|---|---|---|---|---|
| Starting material for PAI resin based insulating varnish | Isocyanate constituent | 2,4'-MDI (Mw = 250) | 12.5 g (0.05 mol) | 50.0 g (0.20 mol) | 125.0 g (0.50 mol) | 50.0 g (0.20 mol) | 50.0 g (0.20 mol) |
|  |  | 4,4'-MDI (Mw = 250) | 237.5 g (0.95 mol) | 200.0 g (0.80 mol) | 125.0 g (0.50 mol) |  | 150.0 g (0.60 mol) |
|  |  | TDI (Mw = 174) |  |  |  | 139.2 g (0.80 mol) |  |
|  |  | EDI (Mw = 252) |  |  |  |  | 25.2 g (0.10 mol) |
|  |  | NDI (Mw = 210) |  |  |  |  | 21.0 g (0.10 mol) |
|  | Acid constituent | TMA (Mw = 192) | 192.0 g (1.00 mol) | 192.0 g (1.00 mol) | 192.0 g (1.00 mol) | 172.8 g (0.90 mol) | 172.8 g (0.90 mol) |
|  |  | PMDA (Mw = 218) |  |  |  | 21.8 g (0.10 mol) |  |
|  |  | BTDA (Mw = 322) |  |  |  |  | 32.2 g (0.10 mol) |
|  |  | ODPA (Mw = 310) |  |  |  |  |  |
|  | Solvent | NMP | 1000 g | 1000 g | 1000 g | 900 g | 1050 g |
|  | Diluent | DMF | 300 g | 300 g | 300 g | 250 g | 300 g |
|  | Catalyst | 1,2-Dimethyl imidazole |  |  | 2.2 g |  |  |
| Properties of PAI resin based insulating varnish | Appearance |  | Transparent brown | Transparent brown | Transparent brown | Transparent brown | Transparent brown |
|  | Nonvolatile content (mass %) |  | 25.2 | 25.2 | 25.1 | 24.8 | 24.8 |
|  | Reduced viscosity (dl/g) |  | 0.50 | 0.51 | 0.51 | 0.49 | 0.49 |
|  | Elongation of polyamide-imide coating |  | 71% | 75% | 81% | 78% | 77% |
| General properties of insulated wire | Structure | Inner layer | Invented PAI | Invented PAI | Invented PAI | Invented PAI | Invented PAI |
|  |  | Intermediate layer | — | — | — | — | — |
|  |  | Outer layer | — | — | — | — | — |

TABLE 1-continued

|  |  |  |  |  |  |  |  |
|---|---|---|---|---|---|---|---|
|  | Dimensions (mm) | Conductor diameter | 0.800 | 0.800 | 0.800 | 0.800 | 0.800 |
|  |  | Coating Thickness Inner layer | 0.031 | 0.031 | 0.030 | 0.031 | 0.030 |
|  |  | Intermediate layer | — | — | — | — | — |
|  |  | Outer layer | — | — | — | — | — |
|  |  | Finished outer diameter | 0.862 | 0.862 | 0.860 | 0.862 | 0.860 |
|  | Flexibility (Minimum tolerable winding diameter) | Unstretched | Conductor diameter | Conductor diameter | Conductor diameter | Conductor diameter | Conductor diameter |
|  |  | 20% stretched | Conductor diameter | Conductor diameter | Conductor diameter | Conductor diameter | Conductor diameter |
|  |  | 30% stretched | Twice conductor diameter | Conductor diameter | Conductor diameter | Twice conductor diameter | Conductor diameter |
|  | Scrape resistance (Maximum tolerable number of double rubs) |  | 431 | 425 | 401 | 452 | 433 |
|  | Adhesion (Maximum tolerable number of cycles) |  | 124 | 126 | 128 | 122 | 125 |
|  | Breakdown voltage (kV) |  | 13.6 | 13.3 | 13.4 | 13.5 | 13.5 |
|  | Thermal resistance (280° C. × 168 h) | Residual ratio of breakdown voltage | 75.2% | 72.9% | 72.6% | 75.8% | 73.3% |
| Press-formability of insulated wire | 40% deformation | Residual ratio of breakdown voltage | 83% | 86% | 90% | 84% | 83% |
|  | 50% deformation |  | 60% | 71% | 75% | 68% | 62% |
|  | 60% deformation |  | 28% | 36% | 41% | 38% | 23% |

|  |  |  | Example 6 | Example 7 | Example 8 | Example 9 | Example 10 |
|---|---|---|---|---|---|---|---|
| Starting material for PAI resin based insulating varnish | Isocyanate constituent | 2,4'-MDI (Mw = 250) | 50.0 g (0.20 mol) | 50.0 g (0.20 mol) | 50.0 g (0.20 mol) | 50.0 g (0.20 mol) | 50.0 g (0.20 mol) |
|  |  | 4,4'-MDI (Mw = 250) | 200.0 g (0.80 mol) | 200.0 g (0.80 mol) | 200.0 g (0.80 mol) | 200.0 g (0.80 mol) | 200.0 g (0.80 mol) |
|  |  | TDI (Mw = 174) |  |  |  |  |  |
|  |  | EDI (Mw = 252) |  |  |  |  |  |
|  |  | NDI (Mw = 210) |  |  |  |  |  |
|  | Acid constituent | TMA (Mw = 192) | 172.8 g (0.90 mol) | 153.6 g (0.80 mol) | 192.0 g (1.00 mol) | 192.0 g (1.00 mol) | 192.0 g (1.00 mol) |
|  |  | PMDA (Mw = 218) |  |  |  |  |  |
|  |  | BTDA (Mw = 322) | 32.2 g (0.10 mol) |  |  |  |  |
|  |  | ODPA (Mw = 310) |  | 62.0 g (0.20 mol) |  |  |  |
|  | Solvent | NMP | 1050 g | 1050 g | 1000 g | 1000 g | 1000 g |
|  | Diluent | DMF | 300 g | 300 g | 300 g | 300 g | 300 g |
|  | Catalyst | 1,2-Dimethyl imidazole |  |  |  |  |  |
| Properties of PAI resin based insulating varnish | Appearance |  | Transparent brown | Transparent brown | Transparent brown | Transparent brown | Transparent brown |
|  | Nonvolatile content (mass %) |  | 25.0 | 25.4 | 25.1 | 25.1 | 25.1 |
|  | Reduced viscosity (dl/g) |  | 0.49 | 0.49 | 0.50 | 0.50 | 0.51 |
|  | Elongation of polyamide-imide coating |  | 75% | 74% | 75% | 75% | 75% |
| General properties of insulated wire | Structure | Inner layer | Invented PAI | Invented PAI | Adhesive PAI | Adhesive PAI | Adhesive PAI |
|  |  | Intermediate layer | — | — | Invented PAI | — | — |
|  |  | Outer layer | — | — | Self-Lubricating PAI | Invented PAI | Conventional PAI |
|  | Dimensions (mm) | Conductor diameter | 0.800 | 0.800 | 0.800 | 0.800 | 0.800 |
|  |  | Coating Thickness Inner layer | 0.031 | 0.031 | 0.005 | 0.005 | 0.025 |
|  |  | Intermediate layer | — | — | 0.024 | — | — |
|  |  | Outer layer | — | — | 0.002 | 0.025 | 0.005 |
|  |  | Finished outer diameter | 0.862 | 0.862 | 0.862 | 0.860 | 0.860 |
|  | Flexibility (Minimum tolerable winding diameter) | Unstretched | Conductor diameter | Conductor diameter | Conductor diameter | Conductor diameter | Conductor diameter |
|  |  | 20% stretched | Conductor diameter | Conductor diameter | Conductor diameter | Conductor diameter | Conductor diameter |
|  |  | 30% stretched | Conductor diameter | Conductor diameter | Conductor diameter | Conductor diameter | Conductor diameter |
|  | Scrape resistance (Maximum tolerable number of double rubs) |  | 422 | 419 | 1580 | 431 | 428 |
|  | Adhesion (Maximum tolerable number of cycles) |  | 126 | 129 | 142 | 143 | 125 |
|  | Breakdown voltage (kV) |  | 13.0 | 13.7 | 13.6 | 13.5 | 13.7 |
|  | Thermal resistance (280° C. × 168 h) | Residual ratio of breakdown voltage | 74.8% | 75.5% | 73.5% | 72.9% | 74.0% |

TABLE 1-continued

| | | | | | | | |
|---|---|---|---|---|---|---|---|
| Press-formability of insulated wire | 40% deformation | Residual ratio of breakdown voltage | 79% | 84% | 92% | 88% | 77% |
| | 50% deformation | | 67% | 68% | 81% | 74% | 62% |
| | 60% deformation | | 38% | 38% | 55% | 39% | 22% |

PAI: polyamide-imide,
Mw: molecular weight.

TABLE 2

| | | | Comparative example 1 | Comparative example 2 | Comparative example 3 | Comparative example 4 |
|---|---|---|---|---|---|---|
| Starting material for PAI resin based insulating varnish | Isocyanate constituent | 2,4'-MDI (Mw = 250) | | 5.0 g (0.02 mol) | 175.0 g (0.70 mol) | |
| | | 4,4'-MDI (Mw = 250) | 250.0 g (1.00 mol) | 245.0 g (0.98 mol) | 75.0 g (0.30 mol) | 50.0 g (0.20 mol) |
| | | TDI (Mw = 174) | | | | 139.2 g (0.80 mol) |
| | | EDI (Mw = 252) | | | | |
| | | NDI (Mw = 210) | | | | |
| | Acid constituent | TMA (Mw = 192) | 192.0 g (1.00 mol) | 192.0 g (1.00 mol) | 192.0 g (1.00 mol) | 172.8 g (0.90 mol) |
| | | PMDA (Mw = 218) | | | | 21.8 g (0.10 mol) |
| | | BTDA (Mw = 322) | | | | |
| | | ODPA (Mw = 310) | | | | |
| | Solvent | NMP | 1000 g | 1000 g | 1000 g | 900 g |
| | Diluent | DMF | 300 g | 300 g | 300 g | 250 g |
| | Catalyst | 1,2-Dimethyl imidazole | | | 2.2 g | |
| Properties of PAI resin based insulating varnish | | Appearance | Transparent brown | Transparent brown | Transparent brown | Transparent brown |
| | | Nonvolatile content (mass %) | 25.1 | 25.2 | 25.1 | 24.8 |
| | | Reduced viscosity (dl/g) | 0.51 | 0.51 | 0.41 | 0.50 |
| | | Elongation of polyamide-imide coating | 45% | 48% | 48% | 46% |
| General properties of insulated wire | Structure | Inner layer | Above-described PAI | Above-described PAI | Above-described PAI | Above-described PAI |
| | | Intermediate layer | — | — | — | — |
| | | Outer layer | — | — | — | — |
| | Dimensions (mm) | Conductor diameter | 0.800 | 0.800 | 0.800 | 0.800 |
| | | Coating Thickness Inner layer | 0.031 | 0.031 | 0.030 | 0.030 |
| | | Intermediate layer | — | — | — | — |
| | | Outer layer | — | — | — | — |
| | | Finished outer diameter | 0.862 | 0.862 | 0.860 | 0.860 |
| | Flexibility (Minimum tolerable winding diameter) | Unstretched | Conductor diameter | Conductor diameter | Conductor diameter | Conductor diameter |
| | | 20% stretched | Twice conductor diameter | Twice conductor diameter | Conductor diameter | Twice conductor diameter |
| | | 30% stretched | Quintuple conductor diameter | Quadruple conductor diameter | Twice conductor diameter | Quadruple conductor diameter |
| | Scrape resistance (Maximum tolerable number of double rubs) | | 455 | 431 | 360 | 405 |
| | Adhesion (Maximum tolerable number of cycles) | | 115 | 118 | 128 | 118 |
| | Breakdown voltage (kV) | | 13.7 | 13.3 | 11.1 | 13.5 |
| | Thermal resistance (280° C. × 168 h) | Residual ratio of breakdown voltage | 76.9% | 73.3% | 48.0% | 75.8% |
| Press-formability of insulated wire | 40% deformation | Residual ratio of breakdown voltage | 83% | 88% | 90% | 88% |
| | 50% deformation | | 34% | 40% | 45% | 30% |
| | 60% deformation | | 0% | 0% | 0% | 0% |

TABLE 2-continued

|  |  |  | Comparative example 5 | Comparative example 6 | Comparative example 7 | Comparative example 8 |
|---|---|---|---|---|---|---|
| Starting material for PAI resin based insulating varnish | Isocyanate constituent | 2,4'-MDI (Mw = 250) | | | | |
| | | 4,4'-MDI (Mw = 250) | 250.0 g (1.00 mol) | 250.0 g (1.00 mol) | 250.0 g (1.00 mol) | 250.0 g (1.00 mol) |
| | | TDI (Mw = 174) | | | | 139.2 g (0.80 mol) |
| | | EDI (Mw = 252) | | | | |
| | | NDI (Mw = 210) | | | | |
| | Acid constituent | TMA (Mw = 192) | 172.8 g (0.90 mol) | 192.0 g (1.00 mol) | 192.0 g (1.00 mol) | 172.8 g (0.90 mol) |
| | | PMDA (Mw = 218) | | | | 21.8 g (0.10 mol) |
| | | BTDA (Mw = 322) | 32.2 g (0.10 mol) | | | |
| | | ODPA (Mw = 310) | | | | |
| | Solvent | NMP | 1050 g | 1000 g | 1000 g | 900 g |
| | Diluent | DMF | 300 g | 300 g | 300 g | 250 g |
| | Catalyst | 1,2-Dimethyl imidazole | | | | |
| Properties of PAI resin based insulating varnish | Appearance | | Transparent brown | Transparent brown | Transparent brown | Transparent brown |
| | Nonvolatile content (mass %) | | 25.0 | 25.1 | 25.1 | 25.1 |
| | Reduced viscosity (dl/g) | | 0.49 | 0.51 | 0.51 | 0.51 |
| | Elongation of polyamide-imide coating | | 47% | 45% | 45% | 45% |
| General properties of insulated wire | Structure | Inner layer | Above-described PAI | Adhesive PAI | Adhesive PAI | Above-described PAI |
| | | Intermediate layer | — | Above-described PAI | — | — |
| | | Outer layer | — | Self-Lubricating PAI | Above-described PAI | Conventional PAI |
| | Dimensions (mm) | Conductor diameter | 0.800 | 0.800 | 0.800 | 0.800 |
| | | Coating Thickness Inner layer | 0.031 | 0.005 | 0.005 | 0.025 |
| | | Intermediate layer | — | 0.024 | — | — |
| | | Outer layer | — | 0.002 | 0.025 | 0.005 |
| | | Finished outer diameter | 0.862 | 0.862 | 0.860 | 0.860 |
| | Flexibility (Minimum tolerable winding diameter) | Unstretched | Conductor diameter | Conductor diameter | Conductor diameter | Conductor diameter |
| | | 20% stretched | Twice conductor diameter | Twice conductor diameter | Twice conductor diameter | Twice conductor diameter |
| | | 30% stretched | Quintuple conductor diameter | Quintuple conductor diameter | Quintuple conductor diameter | Quintuple conductor diameter |
| | Scrape resistance (Maximum tolerable number of double rubs) | | 424 | 1583 | 441 | 448 |
| | Adhesion (Maximum tolerable number of cycles) | | 114 | 122 | 123 | 114 |
| | Breakdown voltage (kV) | | 13.4 | 13.6 | 13.8 | 13.7 |
| | Thermal resistance (280° C. × 168 h) | Residual ratio of breakdown voltage | 75.1% | 74.2% | 73.9% | 73.2% |
| Press-formability of insulated wire | 40% deformation | Residual ratio of breakdown voltage | 83% | 83% | 78% | 73% |
| | 50% deformation | | 34% | 34% | 35% | 32% |
| | 60% deformation | | 0% | 0% | 0% | 0% |

PAI: polyamide-imide,
Mw: molecular weight.

As shown in Table 1, in Examples 1 to 10, the polyamide-imide coating has a higher elongation percentage and the insulated wire has better press-formability. This good result is obtained probably because the insulated wires according to Examples 1 to 10 are coated with a highly flexible polyamide-imide insulation coating made from a polyamide-imide resin based insulating varnish of the present invention, and therefore have better press-formability.

In contrast, the insulated wire according to Comparative example 1 in Table 2 is coated with a conventional polyamide-imide insulation coating (which is made from an insulating varnish containing a 1:1 molar ratio of 4,4'-MDI to TMA), and as a result is inferior to those according to Examples 1 to 10 in terms of the elongation percentage of the coating and the press-formability of the wire.

In Comparative example 2, the elongation percentage of the coating is low and the press-formability of the wire is poor. This is probably because the 2,4'-MDI content in the isocyanate constituent of the varnish is too small (only 0.02 mol). Also, in Comparative example 3, the elongation percentage of the coating is low and the press-formability of the wire is poor. This is probably because the insulating varnish used has too large a 2,4'-MDI content (as large as 0.70 mol) and as a result has a low reduced specific viscosity and low molecular weight despite the use of the reaction enhancing catalyst. The above result shows that the content of 2,4'-MDI (having a flexible structure) as an isocyanate constituent is preferably 5 to 50 mol %.

The polyamide-imide coatings according to Comparative examples 4 to 8 do not contain any flexible 2,4'-MDI constituent, and therefore have a low elongation percentage. Thus, the resulting insulated wires have poor press-formability.

On the other hand, the insulated wires according to Examples 1 to 10 (coated with an invented polyamide-imide insulation coating) have properties comparable to the insulated wires according to Comparative examples 1 and 4 to 8 (coated with a conventional polyamide-imide insulation coating) in terms of flexibility, wear resistance (scrape resistance), adhesiveness, and thermal resistance.

Furthermore, in particular, both the unstretched and stretched specimens of the insulated wires according to Examples 1 to 10 (coated with an invented polyamide-imide insulation coating) exhibit a higher flexibility than those according to Comparative examples 1 and 4 to 8 (coated with a conventional polyamide-imide insulation coating). It can be thus concluded that the insulated wires according to the present invention have a higher flexibility.

Although the present invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polyamide-imide resin based insulating varnish synthesized by reaction of an isocyanate constituent and an acid constituent in a solvent,
   wherein the isocyanate constituent includes 2,4'-diphenylmethane-diisocyanate having a flexible molecular structure in an amount of 5 to 50 mol % based on the total content of the isocyanate constituent,
   wherein the solvent consists essentially of N-methylpyrrolidone, and
   wherein the polyamide-imide resin based insulating varnish is diluted with a diluent consisting of N,N-dimethylformamide.

2. The polyamide-imide resin based insulating varnish according to claim 1, wherein the isocyanate constituent further includes at least one isocyanate selected from the group consisting of 4,4'-diphenylmethane-diisocyanate, tolylene diisocyanate, diphenyl ether diisocyanate, and naphthalene diisocyanate.

3. The polyamide-imide resin based insulating varnish according to claim 1, wherein the isocyanate constituent further includes 4,4'-diphenylmethane-diisocyanate.

4. The polyamide-imide resin based insulating varnish according to claim 1, wherein the 2,4'-diphenylmethane-diisocyanate having a flexible molecular structure is contained in an amount of 10 to 40 mol % based on the total content of the isocyanate constituent.

5. The polyamide-imide resin based insulating varnish according to claim 1, wherein the acid constituent includes trimellitic anhydride.

6. The polyamide-imide resin based insulating varnish according to claim 1, wherein the solvent consists of N-methylpyrrolidone.

7. An insulated wire comprising:
   a conductor wire; and
   a polyamide-imide insulation coating formed around the conductor wire,
      wherein the polyamide-imide insulation coating is made from a polyamide-imide resin based insulating varnish,
      wherein the varnish is synthesized by reaction of an isocyanate constituent and an acid constituent in a solvent,
      wherein the isocyanate constituent includes 2,4'-diphenylmethane-diisocyanate having a flexible molecular structure in an amount of 5 to 50 mol % based on the total content of the isocyanate constituent,
      wherein the solvent consists essentially of N-methylpyrrolidone, and
      wherein the polyamide-imide resin based insulating varnish is diluted with a diluent consisting of N,N-dimethylformamide.

8. The insulated wire according to claim 7, wherein even when the wire is compressed to such an extent that its diameter is decreased by 50% or less, the compressed wire still maintains a breakdown voltage equal to or higher than 60% of that of the wire before the compression.

9. The insulated wire according to claim 7, wherein the isocyanate constituent further includes at least one isocyanate selected from the group consisting of 4,4'-diphenylmethane-diisocyanate, tolylene diisocyanate, diphenyl ether diisocyanate, and naphthalene diisocyanate.

10. The insulated wire according to claim 7, wherein the isocyanate constituent further includes 4,4'-diphenylmethane-diisocyanate.

11. The insulated wire according to claim 7, wherein the 2,4'-diphenylmethane-diisocyanate having a flexible molecular structure is contained in an amount of 10 to 40 mol % based on the total content of the isocyanate constituent.

12. The insulated wire according to claim 7, wherein the acid constituent includes trimellitic anhydride.

13. The polyamide-imide resin based insulating varnish according to claim 7, wherein the solvent consists of N-methylpyrrolidone.

* * * * *